(12) United States Patent
Torkelson et al.

(10) Patent No.: US 10,814,529 B1
(45) Date of Patent: Oct. 27, 2020

(54) POLYMER-ORGANIC MATTER COMPOSITES USING SOLID-STATE SHEAR PULVERIZATION

(71) Applicant: Northwestern University, Evanston, IL (US)

(72) Inventors: John M. Torkelson, Skokie, IL (US); Philip Brunner, South Milwaukee, WI (US)

(73) Assignee: Northwestern University, Evanston, IL (US)

( * ) Notice: Subject to any disclaimer, the term of this patent is extended or adjusted under 35 U.S.C. 154(b) by 250 days.

(21) Appl. No.: 13/815,868

(22) Filed: Mar. 15, 2013

Related U.S. Application Data

(60) Provisional application No. 61/686,131, filed on Mar. 30, 2012.

(51) Int. Cl.
*B29C 41/04* (2006.01)

(52) U.S. Cl.
CPC ................................. *B29C 41/04* (2013.01)

(58) Field of Classification Search
CPC ...... C08J 3/00; C08K 2201/011; B29B 13/10; B29B 17/04; B29B 17/0404; B29B 2017/0464; B29C 41/04
See application file for complete search history.

(56) References Cited

U.S. PATENT DOCUMENTS

| 4,587,318 A | 5/1986 | Inoue et al. |
| 4,738,815 A | 4/1988 | Friesen |
| 5,814,673 A | 9/1998 | Khait |
| 6,180,685 B1 | 1/2001 | Khait |
| 6,494,390 B1* | 12/2002 | Khait ................. B29B 17/0404 241/23 |
| 7,223,359 B2 | 5/2007 | Torkelson et al. |
| 2006/0084728 A1* | 4/2006 | Barone .................. C08L 89/04 524/10 |

OTHER PUBLICATIONS

Furgiuele, N. et al., "Novel Strategy for Polymer Blend Compatibilization: Solid-State Shear Pulverization", Macromolecules 2000, 33(2), 225-228.

Furgiuele, N. et al., "Efficient Mixing of Polymer Blends of Extreme Viscosity Ratio: Elimination of Phase Inversion Via Solid-State Shear Pulverization", Polym. Eng. Sci. 2000, 40(6), 1447-1457.

Lebovitz, A. et al., "Stabilization of Dispersed Phase to Static Coarsening: Polymer Blend Compatibilization via Solid-State Shear Pulverization", Macromolecules 2002, 35, 8672-8675.

Tao, Y. et al., "Achievement of quasi-nanostructured polymer blends by solid-state shear pulverization and compatibilization by gradient copolymer addition", Polymer 2006, 47, 6773-6781.

Lebovitz, A. et al., "Sub-micron dispersed-phase particle size in polymer blends: overcoming the Taylor limit via solid-state shear pulverization", Polymer 2003, 44, 199-206.

* cited by examiner

*Primary Examiner* — Robert J Grun
(74) *Attorney, Agent, or Firm* — Bell & Manning, LLC

(57) ABSTRACT

Methods for preparation of polymer materials incorporating various organic components, including but not limited to solid and/or liquid organic wastes, post-consumer refuse and agricultural, commercial and/or manufacturing by-products, using solid-state shear pulverization.

10 Claims, 4 Drawing Sheets

POLYMER-ORGANIC MATTER COMPOSITES USING SOLID-STATE SHEAR PULVERIZATION

This application claims priority benefit from application Ser. No. 61/686,131 filed Mar. 30, 2012, the entirety of which is incorporated herein by reference.

This invention was made with government support under DMR-0520513 awarded by the National Science Foundation. The government has certain rights in the invention.

BACKGROUND OF THE INVENTION

Polymer composites using waste or organic materials have long-been envisioned as part of a "green" approach to polymer engineering. However, various problems and deficiencies, most of which related to conventional polymer processing methods, have impeded development of such composite materials. For instance, viscosity differences between a polymeric component and an organic waste component invariably leads to poor component dispersion. High processing temperatures thermally degrade the organic component. Either issue can preclude composite production or, if production is possible, result in unsatisfactory mechanical or physical properties, including the odor of decaying organic matter. Use of organic solvents can alleviate some such concerns, but only with increased environmental and economic costs.

Responsive thereto, attempts were made to employ twin-screw extrusion (TSE) to prepare such green polymer composites. This method has been established as one of the most utilized commercial techniques to process plastics and other polymer-based materials and has numerous advantages including excellent versatility, high throughput and low maintenance. However, TSE has been shown to be somewhat limited for use with composite systems, primarily the result of component viscosity mismatches and inherent thermal dynamic barriers in the technique to achieving desirable composite morphologies.

Other processing techniques present particular dispersion-related issues. For instance, consider rotational molding, an optional approach to melt-processing used to produce hollow containers and other products of larger size and complicated structure which cannot be readily molded by other conventional molding processes, such as injection molding and sheet thermoforming. Products produced by rotational molding typically include, for example, gasoline tanks, casks, storage tanks and toys.

In rotational molding, a plastic resin is melted and fused in a closed mold, without application of external pressure. Typically, a resin-charged mold is moved into an oven apparatus and slowly rotated about two axes. As heat penetrates the mold, the resin adheres to the inner surface until completely fused. The mold is then cooled by air and/or water, while still rotating, to gradually lower the internal temperature. Upon removal of the finished part, the mold can be recharged for another process cycle. A variety of polymeric resins can be utilized, including but not limited to polyethylenes, nylons, fluoropolymers, polycarbonates, polypropylenes, polyurethanes and the like. An example of a prior art rotational molding apparatus is found in Friesen U.S. Pat. No. 4,738,815. An example of a prior art polymeric resin powder for use in rotational molding may be found in Inoue et al. U.S. Pat. No. 4,587,318. Each of the '815 and '318 patents are incorporated herein by reference in its entirety.

As discussed in the '318 patent, polymeric resin powders used in rotational molding can be mixed with colorants/pigments to impart desired color to the molded product. Such colorants and other additives can be added to the polymeric resin powders in the form of dry powders or solids. Unfortunately, these dry materials often present handling and mixing problems. Specifically, dry powders may form undesirable dust or mix unevenly with the polymeric resin powders resulting in non-uniform color/additive distribution in the molded product. Further, additives can agglomerate, leading to poor mechanical performance, and/or "plate-out" of the polymer matrix and deposit on an interior mold surface. Such problems can be addressed by compounding an additive into the polymer resin using extrusion followed by solid-state grinding. While uniform dispersion can be achieved, high processing temperatures can lead to degradation of certain organic additives, with the aforementioned odor concerns.

As a result, there remains an on-going search in the art for one or more methods useful in the development and production of green polymer composites, to better utilize the benefits and advantages available for incorporation of suitable organic matter into polymeric materials.

SUMMARY OF THE INVENTION

In light of the foregoing, it is an object of the present invention to provide one or more methods relating to the use of solid-state shear pulverization to incorporate organic matter into polymeric materials. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide one or more methods to effectively disperse organic matter within a polymer component while maintaining one or more physical or mechanical properties of a product part.

It can be another object of the present invention to provide one or more methods for incorporation of organic matter to impart one or more functional effects to a polymeric resin and resulting product part.

It can also be an object of the present invention, alone or in conjunction with one or more of the preceding objectives, to provide a method for reducing the content of non-renewable petroleum-based polymers by replacement with organic waste material.

Other objects, features, benefits and advantages of the present invention will be apparent from this summary and the following descriptions of certain embodiments, and will be readily apparent to those skilled in the art having knowledge of various plastic production techniques. Such objects, features, benefits and advantages will be apparent from the above as taken into conjunction with the accompanying examples, data and all reasonable inferences to be drawn therefrom, alone or with consideration of the references incorporated herein.

In part, the present invention can be directed toward a method of preparing a polymer composite from a polymer material and an organic material. Such a method can comprise providing a solid and/or liquid organic component and a polymeric resin component mixture; and applying a mechanical energy to such a mixture through solid-state shear pulverization in the presence of an element of cooling at least partially sufficient to maintain such a mixture in a solid state, such pulverization as can be at least partially sufficient to disperse such an organic component within such a polymeric resin component.

In certain embodiments, such a polymer component can be selected from virgin and recycled (i.e., post-consumer) polymers of the sort discussed below, illustrated herein and as would otherwise be understood by those skilled in the art made aware of this invention. In certain such embodiments, such a polymer component can be polyethylene or polypropylene. Regardless, in certain embodiments and irrespective of polymer identity, such an organic component can comprise one or more of the solid and liquid waste, refuse and by-products, and combinations thereof, of the sort discussed below, illustrated herein and as would be understood by those skilled in the art made aware of this invention. Without limitation or identity, such an organic component can comprise about 0.1 wt % to about 50.0 wt % of such a polymer-organic component mixture. A polymer-organic mixture can also comprise one or more additives of the sort discussed below, illustrated herein or as would otherwise be understood by those skilled in the art made aware of this invention. Regardless of the presence of any such additive, after solid-state shear pulverization, such a polymer-organic mixture can be melt-processed, injection molded, blow molded, thermoformed, line extruded, or processed or molded as would otherwise be understood by those skilled in the art made aware of this invention. After any such processing and/or molding, such a mixture and/or resulting product can be incorporated into an article of manufacture.

In part, the present invention can also be directed to a method of rotationally molding a polymeric product comprising a solid and/or liquid organic component. Such a method can comprise providing a solid and/or liquid organic component and a polymer component mixture, applying a mechanical energy thereto through solid-state shear pulverization in the presence of any element of cooling at least partially sufficient to maintain such a mixture in a solid state, such pulverization sufficient to provide a powdered mixture; and introducing such a shear-pulverized powder mixture into a rotational molding apparatus to produce a rotationally-molded product. With regard to any embodiment of such a method, mixture of components, amounts thereof, optional additive(s) and further processing step(s) can be as discussed above or illustrated elsewhere herein.

In part, the present invention can also be directed toward a method of using solid-state shear pulverization to reduce polymer content of a molded product. Such a method can comprise providing a solid and/or liquid organic component and a polymer mixture; introducing such a mixture into a solid-state shear pulverization apparatus, such an apparatus as can comprise a cooling component at least partially sufficient to maintain mixture solid state and melt-processing such a mixture to provide a molded product with a reduced polymeric resin component concentration, such reduction as can be compared to the resin concentration of a melt-processed product prepared without use of a solid-state shear pulverization apparatus. With regard to any embodiment of such a method, mixture of components, amounts thereof, optional additive(s) and further processing step(s) can be as discussed above or illustrated elsewhere herein.

Without limitation, an organic component useful in conjunction with the present invention can be selected from solid or liquid organic wastes, post-consumer refuse, agricultural, commercial and manufacturing by-products, and combinations thereof. Such an organic component can be present in an amount sufficient to provide filler, color and/or other functional effect to a resulting polymeric mixture. In certain embodiments, such an organic waste component can be present in an amount up to about 5 wt % . . . about 10 wt % . . . about 15 wt % . . . about 20 wt % . . . or up to about 50 wt % or more of such a polymeric mixture, an amount limited only by type of organic waste, process considerations and/or that needed to effect a particular mechanical or physical property thereof. For instance, without limitation, such organic matter can be selected from coconut shells, rice husk hulls and rice husk ash, grapeseeds, seaweed, cardboard, coffee grounds, whole or ground chicken feathers and citrus peels, together with various other organic wastes, refuse and by-products of the sort understood by those skilled in the art made aware of this invention.

Regardless of organic component identity, a polymer component useful in conjunction with this invention can be selected from but is not limited to polyesters, polyolefins (e.g., high- and low-density polyethylene), polyamides, epoxies, polycarbonates, polyacrylates, polyvinyls (e.g., polyvinyl chlorides), polyethers, polyacrylonitriles, polyacetals, polysiloxanes, polyetherketones, elastomers, polyimides, polyurethanes, polystyrenes, poly(butyleneterephthates), polycaprolactones and poly(ethyleneterephthates), copolymers thereof, combinations of such polymers, combinations of such copolymers and combinations of such polymers and copolymers, such combinations as can be utilized without compatibilizers of the prior art. Optionally, one or more post-consumer plastic materials, suitably flaked or processed, can be utilized as a polymer component or an adjuvant thereto. Optionally, various other additives can also be incorporated into an organic waste-polymeric resin mixture. Such additives can include but are not limited to compatiblilizers, lubricants, antistats, impact modifiers, anti-oxidants, antimicrobials, light stabilizers, heat stabilizers, flame retardants, release agents, rheological control agents and combinations thereof, together with one or more other additives of the sort understood and recognized by those skilled in the art made aware of this invention. Further, to the extent that the color of a resulting processed product part is not sufficiently addressed by an organic component, one or more colorant components known to those skilled in the art made aware of this invention can be shear pulverized with and into a polymer-organic mixture. Such a colorant can be selected from but is not limited to colorants of the sort described in co-pending application entitled "Colorant Dispersion in Polymer Materials Using Solid-State Shear Pulverization," filed contemporaneously herewith.

DETAILED DESCRIPTION OF CERTAIN EMBODIMENTS

Figure 1:
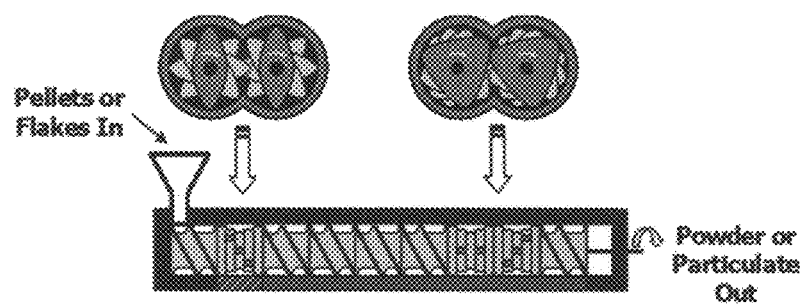
FIG. 1. A schematic illustration of an SSSP apparatus, for use in conjunction with the present invention.

With respect to certain non-limiting embodiments, this invention, incorporating an SSSP process, was utilized to develop novel, green polymer composite materials, has several major advantages over conventional processes like solvent casting, in-situ polymerization, and melt processing—including but not limited to the following: Use of solid-state shear pulverization 1. Overcomes the limitations of thermodynamics, viscosity, and degradation often encountered in melt processing of polymers;
2. Eliminates the use of hazardous solvents, which is a major requirement in achieving sustainability and promoting green chemistry;
3. Affords versatility in screw design, screw speed, and zone temperatures, which all play major roles in adjusting the amount of work applied to the material during processing;
4. Provides continuous, industrially scalable, and high throughput processing—all of which are advantages over batch solid-state processing techniques like ball-milling;
5. Is economically feasible, where the price of producing 1 kg of material is comparable to that of melt-extrusion;
6. Is low maintenance, easy to clean, and simple to operate;
7. Overcomes the issue of low thermal stability often encountered in the production of biocomposite materials since mixing takes place at ambient temperatures (whereas processing of these materials above the melting temperature, $T_m$, leads to filler degradation and intense odors; which negatively impacts the mechanical properties or leads to the inability to produce the composite in the first place); and
8. Eliminates multiple stages in the production of natural fibers/polymer composites by simply breaking up and dispersing the filler with the polymer in one efficient step.

More specifically, relating to use of this invention in conjunction with rotational molding, solid-state shear pulverization can overcome dispersion issues by effectively breaking up additive agglomerates. Further, as applied to organic components, processing in the solid state significantly reduces thermal degradation. Economics are also enhanced by elimination of multiple processing steps—as compared, for instance, to compounding—so much so that small batch production can be economically feasible. Additional advantages relate to the ability to transition from one job/organic component to another with minimal loss of production time.

As discussed below, major benefits from an SSSP apparatus employed in conjunction with the present methodologies relate to the ability to cool the barrel below room temperature and the use of tri-lobe rather than bi-lobe screw elements along a portion of the pulverizer screw. Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.; Torkelson, J. M. *Polymer* 2006, 47, 6773-6781; Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206; and U.S. Pat. Nos. 5,814,673; 6,180,685; and 7,223,359—each of which is incorporated herein by reference in its entirety.)

EXAMPLES OF THE INVENTION

The following non-limiting examples and data illustrate various aspects and features relating to the methods of this invention, including the preparation of effective dispersions of organic components/matter and polymer materials, as can be further utilized in conjunction with various melt-processing or rotational molding operations. In comparison with the prior art, the present methods provide results and data which are surprising, unexpected, and contrary thereto. While the utility of this invention is illustrated through use of several organic and polymer components, it will be understood by those skilled in the art that comparable results are obtainable with various other organic materials, polymers and component mixtures, as are commensurate with the scope of this invention.

Example 1

The SSSP apparatus employed in preparation of the following composites (Examples 2-4, below) is a modified twin-screw extruder from Berstorff (Model ZE 25). It has a length to diameter ratio (L/D) of 26.5, where the first section has a barrel/screw diameter of 25 mm (L/D=19) and remaining section has a diameter of 23 mm (L/D=7.5). The screw elements involved in the 25 mm-section are spiral conveying and bilobe kneading elements, while those in the 23 mm-section are trilobe shearing elements. During operation, the barrels are cooled by a recirculating ethylene glycol/water (60/40 wt/wt) mixture at −7° C. supplied by a Budzar Industries WC-3 chiller, which allows for repeated fragmentation and fusion steps in the solid-state below the glass transition ($T_g$) or melt transition ($T_m$) of the processed polymeric material. For this pulverization instrument, the barrel section with several kneading elements in the upstream portion of the screws is termed the mixing zone. A long conveying zone follows the mixing zone to sufficiently cool the deformed material before intense pulverization takes place downstream in the pulverization zone.

Example 2

The use of chicken feathers as an additive to polymeric materials presents several major issues that must be overcome before they can be considered as a viable filler option. First, the fibrous feathers cannot be well dispersed at the low temperatures using conventional melt processing. Accordingly, it has been found that the fibers are thermally stable for long periods of time up to 200° C., but the best composite properties were found at processing temperatures of 205° C. and above, where the fibers are only stable for a few minutes. Second, studies have shown that processing chicken feathers at high temperatures releases hazardous gases such as hydrogen sulfide and sulfur dioxide; therefore, novel processing techniques must be employed to retain the intrinsic properties of the fibers and to eliminate the release of hazardous gases by processing at reduced temperatures. Finally, it is not possible to obtain good mixing of the feathers in their native form and matrix polymers to develop compression or injection molded composites. Therefore, the whole feather must be processed into smaller sized particles prior to compounding with the polymer resin. This multiple stage processing of the chicken feathers is energy intensive and costly.

Figure 2:
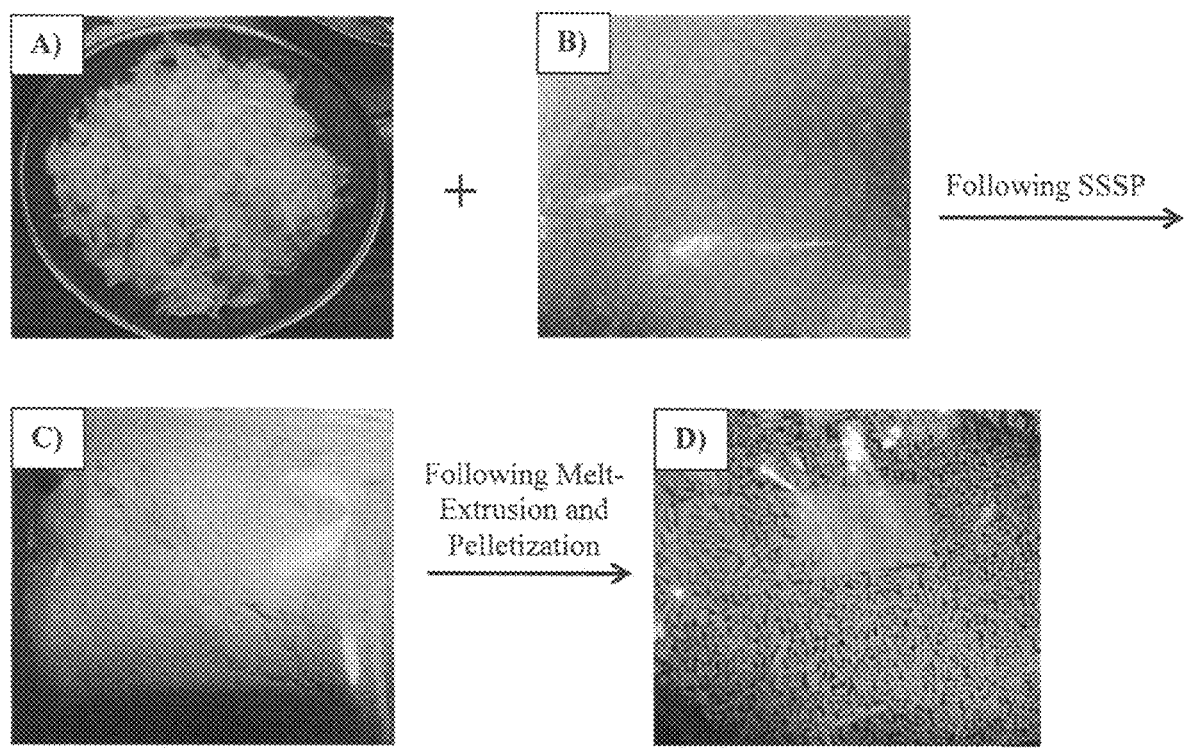
FIG. 2. Digital images of a) chicken feathers, b) polypropylene, c) powder following SSSP processing and d) melt-extrusion and pelletization.

Through use of the present invention, these processing issues have been overcome, to make polymer/chicken fiber composites from the whole feather. FIGS. 2a and 2b shows whole chicken feathers and neat polypropylene (PP), respectively. Following SSSP processing the output is a uniform powder (FIG. 2c) that was easily melt-extruded and pelletized (FIG. 2d). These pellets can easily be used for compression or injection molding into a final consumer product. From FIG. 2c, it is evident that SSSP processing allows for excellent dispersion of the whole chicken feathers in the PP matrix. As confirmed by lack of color change, there is no degradation.

Example 3

The major issue with adding used coffee grounds to polymers via conventional methods, like melt-processing, is the huge difference in viscosities. In the melt state, polymers will flow whereas coffee grounds will not. It is the major differences in viscosities that make it very difficult to disperse the coffee grounds effectively and efficiency. As mentioned previously, poor dispersion leads to unfavorable properties or the inability to produce the composite material. SSSP at low-temperature can be used to overcome these major processing issues to successfully produce polymer/used coffee ground composites that have unique physical properties. Ultimately, the use of SSSP can significantly reduce the environmental impact of waste coffee grounds and provide a low-value filler for high value applications.

Figure 3:
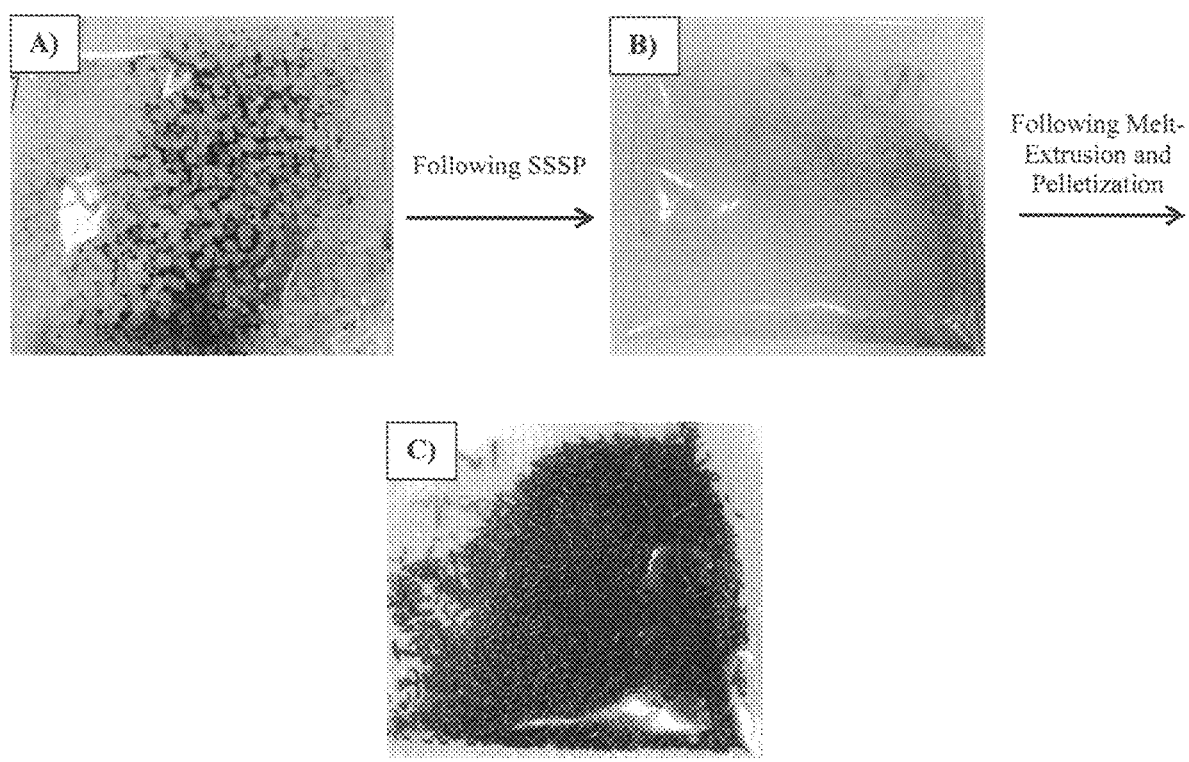
FIG. 3. Digital images of a) used coffee grounds and polypropylene, b) powder following SSSP processing and c) melt-extrusion and pelletization.

Again, using the present invention these processing issues have been overcome to make polymer/used coffee ground composites. FIG. 3a shows neat PP with hand-mixed used coffee grounds. Following SSSP processing the output is a uniform powder (FIG. 3b) that was easily melt-extruded and pelletized (FIG. 3c). These pellets can easily be used for compression or injection molding into a final consumer product. From FIG. 3b, it is evident that SSSP processing allows for excellent dispersion of the coffee grounds in the PP matrix. In addition to the excellent dispersion, the final pellets have a unique coffee scent that could have benefits as an odor mask or shield for foul smelling substances. Additionally, this zero-value organic waste material could be used as a colorant additive in making brown colored plastics, thereby contributing to additional cost savings.

Example 4

Figure 4:
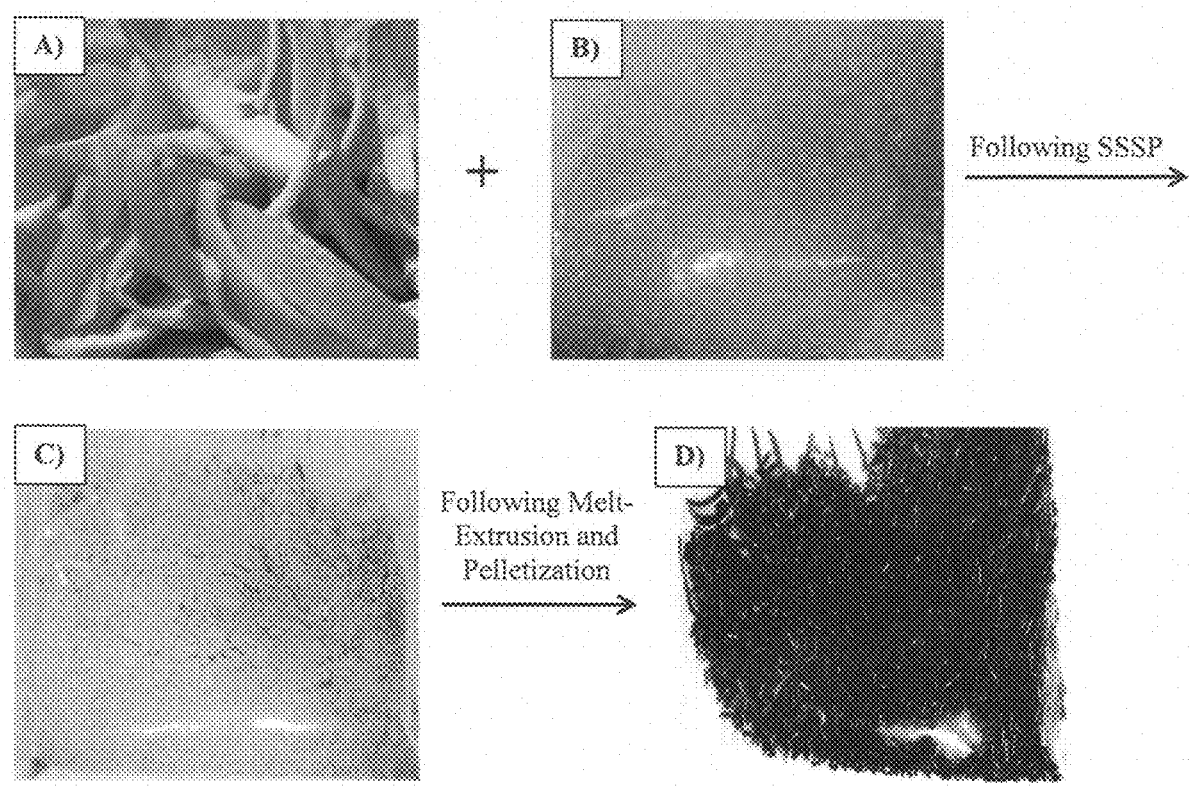
FIG. 4. Digital images of a) orange peels, b) polypropylene, c) powder following SSSP processing and d) melt-extrusion and pelletization.

SSSP processing can also be used to prepare polymer/orange peel composites. FIGS. 4a and 4b are images of orange peels and neat PP, respectively. Following SSSP processing the output is a uniform powder (FIG. 4c) that was easily melt-extruded and pelletized (e.g., master batch pellets FIG. 4d). These pellets can easily be used for compression or injection molding into a final consumer product. From FIG. 4c, it is evident that SSSP processing allows for excellent dispersion of the orange peels in the PP matrix. In addition to the excellent dispersion, the final pellets have a unique scent that could have benefits as an odor/mask shield for foul smelling substances. Ultimately, a composite with orange peels allows for the reduction of the non-renewable content of petroleum-based polymers, such as polypropylene and polyethylene, to also reduce cost and promote sustainable engineering.

Example 5

From a commercial perspective, the present invention can be utilized for the addition of solid organic waste to polymeric materials in conjunction with processes including but not limited to injection molding, blow molding, compression molding, fiber spinning, and other melt-processing techniques understood in the art.

We claim:

1. A method of rotationally-molding a polymer product comprising an organic component, said method comprising:
   providing a polymer component and organic component mixture, wherein said organic component is selected from coffee grounds, citrus peels, grape waste, coconut shells, rice husk hulls, rice husk ash, seaweeds, and combinations thereof;
   applying a mechanical energy to said mixture through solid-state shear pulverization in the presence of cooling at least partially sufficient to maintain said mixture in a solid state during said pulverization, said pulverization absent a solvent, at a temperature below the melting point of said polymer component and sufficient to provide a powdered mixture; and
   introducing said pulverized powder mixture into a rotational molding apparatus, to produce a rotationally-molded product.

2. The method of claim 1 wherein said polymer component is selected from virgin and recycled polyesters, polyolefins, polyamides, epoxies, polyimides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

3. The method of claim 1 wherein said polymer component comprises a polyolefin.

4. The method of claim 1 wherein said organic component comprises about 1.0 wt. % to about 50.0 wt. % of said mixture.

5. The method of claim 1 wherein said rotationally molded product is incorporated into an article of manufacture.

6. A method of using solid-state shear pulverization to reduce the polymer content of a polymer-organic component composite, said method comprising:
   providing a polymer component and organic component mixture, wherein said organic component is selected from coffee grounds, citrus peels, grape waste, coconut shells, rice husk hulls, rice husk ash, seaweeds, and combinations thereof;
   applying a mechanical energy to said mixture through solid-state shear pulverization in the presence of cooling at least partially sufficient to maintain said mixture in a solid-state during said pulverization, said pulverization absent a solvent, at a temperature below the melting point of said polymer component and sufficient to provide a powdered mixture; and
   melt-processing said pulverized mixture to provide a molded product.

7. The method of claim 6 wherein said polymer component is selected from virgin and recycled polyesters, polyolefins, polyamides, epoxies, polyimides, polyurethanes, polystyrenes, polycarbonates, polyacrylates, polyvinyls, polyethers, polyacrylonitriles, polyacetals, polysiloxanes, polyetherketones, elastomers and copolymers thereof, combinations of said polymers, combinations of said copolymers and combinations of said polymers and copolymers.

8. The method of claim 6 wherein said polymer component comprises a polyolefin.

9. The method of claim 6 wherein said organic component comprises about 1.0 wt. % to about 50 wt. % of said mixture.

10. The method of claim 6 wherein said composite is incorporated into an article of manufacture.

\* \* \* \* \*